United States Patent [19]

Megna et al.

[11] Patent Number: 4,556,703

[45] Date of Patent: Dec. 3, 1985

[54] LOW HEAT BUILDUP POLYURETHANE COMPOSITIONS AND ARTICLES

[75] Inventors: Ignazio S. Megna, Lebanon; Curtis A. Franz, Piscataway, both of N.J.

[73] Assignee: American Cyanamid Company, Stamford, Conn.

[21] Appl. No.: 609,662

[22] Filed: May 14, 1984

[51] Int. Cl.⁴ .................. C08G 18/76; C08G 18/10; C08G 18/16

[52] U.S. Cl. .................... 528/49; 252/182; 528/44; 528/48; 528/53; 528/54; 528/55; 528/56; 528/58; 528/63; 528/64; 528/67; 528/906

[58] Field of Search .............. 528/67, 44, 48, 49, 528/63, 64, 54, 906

[56] References Cited

U.S. PATENT DOCUMENTS

| | | | |
|---|---|---|---|
| 3,022,328 | 2/1962 | Cobb | 260/453 |
| 3,217,024 | 11/1965 | Park et al. | 528/44 |
| 3,316,285 | 4/1967 | Cleveland | 528/44 |
| 3,554,872 | 1/1971 | Chang et al. | 528/44 |
| 3,620,929 | 11/1971 | Kober et al. | 548/305 |
| 3,681,290 | 8/1972 | Meckel et al. | 528/63 |
| 3,701,374 | 10/1972 | McGillvary | 528/64 |
| 3,752,790 | 8/1973 | McShane et al. | 528/63 |
| 3,963,681 | 6/1976 | Kaneko et al. | 260/77.5 AM |
| 4,001,180 | 1/1977 | Doyle et al. | 528/63 |
| 4,002,584 | 1/1977 | Takahashi et al. | 260/18 TN |
| 4,029,730 | 6/1977 | Schroeder | 528/64 |
| 4,089,822 | 5/1978 | Vial et al. | 260/18 TN |
| 4,133,943 | 1/1979 | Blahak et al. | 528/63 |
| 4,182,825 | 1/1980 | Jackle | 528/44 |
| 4,293,680 | 10/1981 | Mazanek et al. | 528/67 |
| 4,309,378 | 1/1982 | Ganster et al. | 528/64 |
| 4,343,339 | 8/1982 | Schwindt et al. | 528/64 |
| 4,365,051 | 12/1982 | Chung et al. | 528/64 |

OTHER PUBLICATIONS

Vieweg-Hoechtlen, Polyurethane, Karl Hanser Verlag, Munich (1966) pp. 96–102.

*Primary Examiner*—Herbert S. Cockeram
*Attorney, Agent, or Firm*—Henry C. Jeanette

[57] ABSTRACT

A prepolymer curable with a hydroxyl or amine functional curative to form a polyurethane elastomer composition having low heat buildup characteristics is disclosed. Specifically, the polyurethane prepolymer has terminally reactive isocyanate groups and is prepared by reaction of polymeric diol with a stoichiometric excess of a mixture of the 2,6- and 2,4-isomers of tolylene diisocyanate, said mixture containing from about 50 to about 90 wt % of the 2,6-isomer.

The invention also relates to a polyurethane elastomer composition comprising the aforementioned prepolymer and a curingly effective amount of a curative selected from the group consisting of aromatic diamines, hydroxy functional compounds, and mixtures thereof, and optionally, from about 0.01 to 1 part of catalyst per hundred parts of prepolymer.

Also disclosed are articles of manufacture produced from the above composition, as well as compositions wherein the mixture contains 40 to 100 wt % of the 2,6-isomer.

26 Claims, 1 Drawing Figure

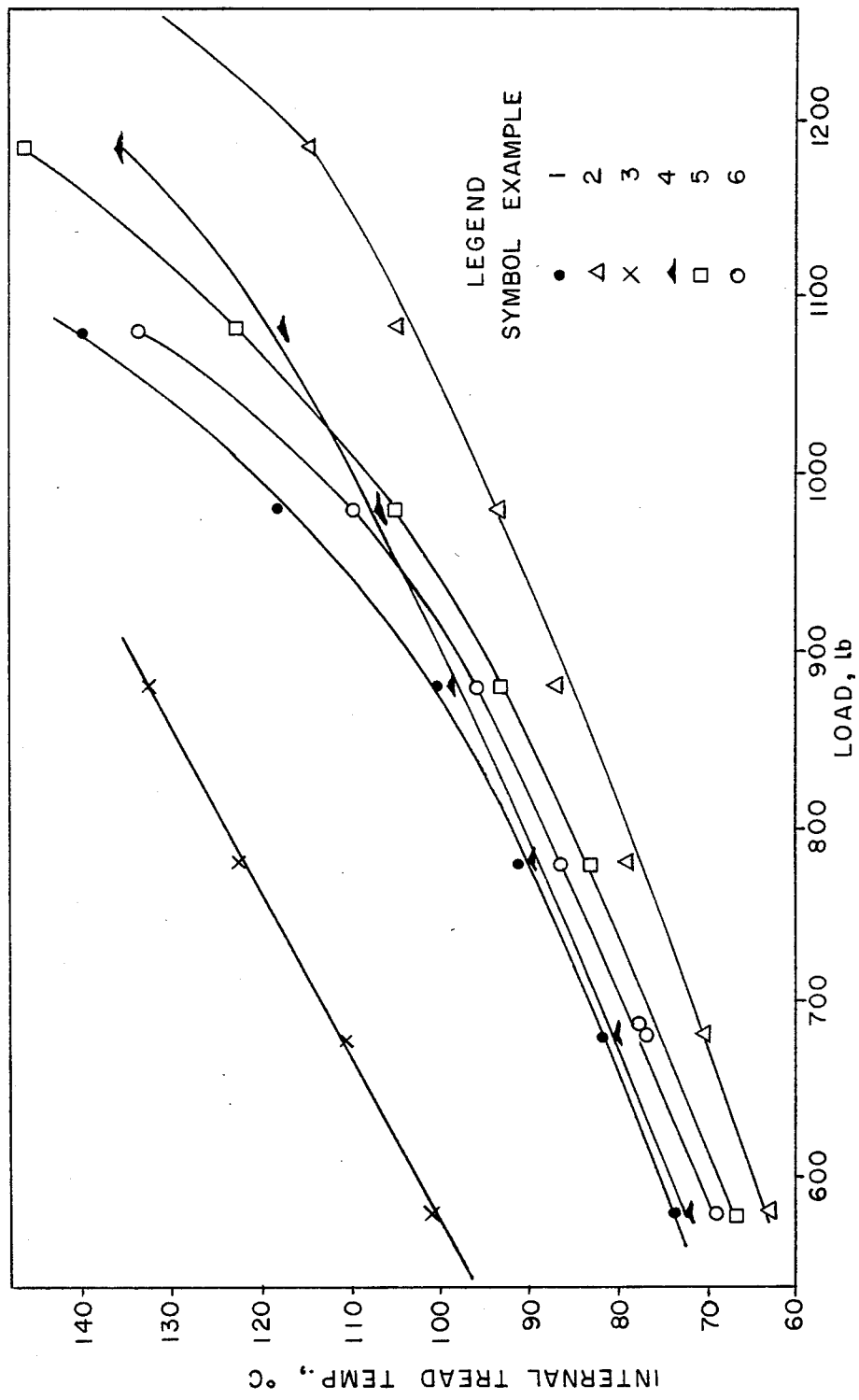

LOW HEAT BUILDUP POLYURETHANE COMPOSITIONS AND ARTICLES

BACKGROUND

It is generally known in the art that polyurethane elastomers have many applications, including, for example, producing industrial tires. A commonly used polyisocyanate for producing these polyurethane elastomers is 2,4-toluene diisocyanate (tolylene diisocyanate) or an isomeric mixture of 80 wt % of 2,4- tolylene diisocyanate and 20 wt % of 2,6-tolylene diisocyanate.

When a urethane wheel carries a load, work is applied to the urethane during compression or deflection. Upon removing the load most of the work is recovered as the tread returns to its original shape. A portion of the work is not recovered but is converted instead to heat. This is because there is no elastomer that is perfectly elastic.

In operation, urethane tires are subjected to repeated cycles of compression and relaxation which generate heat within the tire, causing an increase in tire temperature. The amount of heat generated is determined by the load on the tire, the tire rotation speed, and the amount of urethane in the tires.

Unless the heat generated can be dissipated rapidly, for example by conduction along the metal hub or by heat loss to the air, the temperature inside the elastomer will rise. Eventually the elastomeric tread of a rotating wheel may melt, delaminate from the hub or blow out due to the formation of gaseous decomposition products.

U.S. Pat. No. 4,089,822 discloses polyurethane elastomers made from polyurethane prepolymers. The prepolymers are made from 2,4-tolylene diisocyanate, 2,6-tolylene diisocyanate or a mixture of tolylene diisocyanates containing a major proportion of the 2,4-isomer. However, this patent does not recognize and therefore does not solve the problem of heat buildup in objects made from these polyurethane elastomers.

U.S. Pat. No. 3,963,681 discloses a polyurethane elastomer composition having improved static mechanical properties made from a polyfunctional isocyanate, curing agent and polyether. Among the polyfunctional isocyanates disclosed for use are tolylene-2,4-diisocyanate, tolylene-2,6-diisocyanate and their mixtures. The weight average molecular weight of the polyether is within the range of 1,000 to less than 4,500. Also, the molecular weight distribution curve of the polyether has at least two peaks. At least one peak is located in the higher molecular weight region and at least another one is located in the lower molecular weight region relative to the rheological critical molecular weight of the polyether. According to the patent, to obtain the improved properties of the compositions, one of the essential factors is the use of polyethers having the particular molecular weight range described (see, for example, the paragraph bridging columns 3 and 4, and paragraphs 1 to 3 of Column 4). This patent does not solve the problem of heat buildup in polyurethane elastomers. Furthermore, there is no recognition that by utilizing a particular level of 2,6-tolylene diisocyanate in the composition there is obtained a lower heat buildup tolylene diisocyanate based polyurethane elastomer.

A welcome contribution to the art would be a polyurethane elastomer that has low heat buildup characteristics (a dynamic mechanical property). Such a contribution is provided for by this invention.

SUMMARY OF THE INVENTION

This invention provides a prepolymer curable with a polyhydroxy or polyamine functional curative to form a polyurethane elastomer composition having low heat buildup characteristics, said prepolymer comprising terminally reactive isocyanate groups and formed as a reaction product of polymeric diol with a stoichiometric excess of a mixture of the 2,6- and 2,4- isomers of tolylene diisocyanate, wherein said mixture contains from about 50 to about 90 wt % of the 2,6-isomer.

Another embodiment of this invention provides a polyurethane elastomer composition, having low heat buildup characteristics, comprising the reaction product of:

(a) a polyurethane prepolymer having terminally reactive isocyanate groups and formed as a reaction product of polymeric diol with a stoichiometric excess of a mixture of the 2,6- and 2,4- isomers of tolylene diisocyanate, wherein said mixture contains from about 50 to about 90 wt % of the 2,6-isomer, with (b) a curingly effective amount of a curative selected from the group consisting of aromatic diamines, hydroxy functional compounds, and mixtures thereof, and (c) optionally, from about 0.01 to 1 part of catalyst per hundred parts of prepolymer.

Still another embodiment of this invention provides a method of making tolylene diisocyanate-based polyurethane elastomers having low heat buildup characteristics comprising utilizing as said tolylene diisocyanate:

(a) 2,6-tolylene diisocyanate, or (b) a mixture of the 2,4- and the 2,6- isomers of tolylene diisocyanate containing at least about 40 wt %, based on the weight of the isomeric mixture, of the 2,6-isomer.

In this embodiment, the elastomers are also produced when the isomeric mixture contains the 2,6- isomer in the amounts described hereinbelow for the isomeric mixtures of the compositions of this invention.

In yet another embodiment of this invention there is provided articles of manufacture, having low heat buildup characteristics, made from the compositions of this invention. In particular, articles of manufacture which operate under a load, such as industrial tires (wheels) and industrial rolls for example, are provided for from compositions of this invention wherein (b) is an aromatic diamine, preferably 4,4'-methylenebis(o-chloroaniline) or a mixture of an aromatic diamine and a minor amount of a hydroxy functional compound.

A further embodiment of this invention provides articles of manufacture having low heat buildup characteristics made from a polyurethane elastomer composition comprising the reaction product of:

(a) a polyurethane prepolymer having terminally reactive isocyanate groups and formed as a reaction product of polymeric diol with a stoichiometric excess of a mixture of the 2,6- and 2,4- isomers of tolylene diisocyanate, wherein said mixture contains from about 40 to about 100 wt % of the 2,6- isomer, with (b) a curingly effective amount of a curative selected from the group consisting of aromatic diamines, hydroxy functional compounds, and mixtures thereof, and (c) optionally, from about 0.01 to 1 part of catalyst per hundred parts of prepolymer wherein (a), (b) and (c) are as defined for the compositions of this invention except that, as stated above, the mixture in (a) contains from about 40 to about 100 wt %, preferably about 50 to about 100 wt %, of 2,6-tolylene diisocyanate.

As used herein, "low heat buildup characteristics" means that the polyurethane elastomer compositions formed from the prepolymers of this invention exhibit a lower heat buildup under corresponding test or use conditions than polyurethane compositions based on an 80%/20% 2,4/2,6- isomeric mixture of tolylene diisocyanate or based on 100% 2,4-tolylene diisocyanate.

As used herein "polymeric diol" includes mixtures of compatible diols, e.g., mixtures of polyether diols, mixtures of polyester diols, and compatible mixtures of polyether diols and polyester diols. Those skilled in the art will appreciate that the term "compatible" means the diols are mutually soluble in each other so as to form a single phase.

BRIEF DESCRIPTION OF THE DRAWING

FIG. 1 demonstrates graphically the heat buildup as a function of load for Examples 1-6.

DETAILED DESCRIPTION OF THE INVENTION

The polyether and polyester diols normally used in the preparation of polyurethane elastomers—e.g., hydroxyl-terminated—can be employed as the polymeric diols in preparing the compositions of this invention. Representative diols are polyalkylene ether glycols such as polyethylene ether glycol, polypropylene ether glycol and poly (tetramethylene ether) glycol and the polyethers prepared by the copolymerization of cyclic ethers such as ethylene oxide, propylene oxide, trimethylene oxide, and tetrahydrofuran with aliphatic diols such as ethylene glycol, 1,3-butanediol, 1,4-butanediol, diethylene glycol, dipropylene glycol, 1,2-propylene glycol, and 1,3-propylene glycol. Mixtures of polyethers, for example, a mixture of polytetramethylene ether glycol and polypropylene-polyethylene oxide ether glycol, may be used.

The low heat buildup property of the compositions of this invention is not dependent upon a polyether molecular weight distribution. Thus, any weight average molecular weight polyether or mixtures thereof are considered useful in the compositions of this invention. However; in general, polyethers are used having a weight average molecular weight within the range of from about 445 to about 2100. Products within this range are commercially available. Preferably, the weight average molecular weight is within the range of from about 800 to about 1200.

Suitable hydroxyl-terminated polyesters useful herein include, but are not limited to polyethyleneadipate, polypropyleneadipate, poly(ethylene-propylene)adipate, polybutyleneadipate, polyhexamethyleneadipate, and the like, and the copolyesters prepared by copolymerizing ethylene glycol and propylene glycol with the foregoing polyesters during their preparation—such as, for example, poly(1,4-butylene-ethylene)adipate, poly(1,4butylene-propylene)adipate, and poly(1,4-butylene-ethylenepropylene) adipate. Other hydroxyl-terminated polyesters are well recognized as useful in polyurethane technology and include those derived from the polymerization of caprolactones and from the condensation of dicarboxylic acids such as succinic, malonic, pimelic, sebacic and suberic acids among others with diols such as ethylene glycol, 1,2-propanediol, 1,3-propanediol, 2,2-dimethyl-1,3-propanediol, 1,4-butanediol, 1,5-pentane-diol, 1,6-hexanediol, and the like. Mixtures of polyesters may also be used.

The mixture of the tolylene diisocyanate isomers preferably contains from about 50 to about 90 wt % based on the weight of the isomeric mixture, of 2,6-tolylene diisocyanate, with from about 50 to about 75 wt % being more preferred, and from about 50 to about 65 wt % being most preferred. The ranges of the 2,6-isomer are based on performance characteristics and economics. It is preferred that the compositions have a high amount of the 2,6- isomer; however, economics make the use of about 50 to about 65 wt % preferable.

As stated above, a curingly effective amount of a curative selected from the group consisting of aromatic diamines, hydroxyfunctional compounds or mixtures thereof is reacted with the prepolymer. The curative is used within the range of from about 80 to about 110% of the stoichiometrically required amount, with from about 85 to about 100% of the stoichiometric amount being preferred.

The physical properties—e.g., hardness—of the compositions of this invention are affected by the curative used and the molecular weight of the polymeric diols. Therefore, the products which can be produced from these compositions are also related to the curative and the polymeric diols used. When polymeric diols having a high molecular weight are utilized softer compositions (Shore hardness measurement) are obtained. Utilizing polymeric diols having a lower molecular weight results in harder composition (Shore hardness measurement). The terms high or lower molecular weight refers to the weight average molecular weight ranges described hereinabove. For example, some articles of manufacture—e.g., industrial tires (wheels)—require a relatively hard polyurethane elastomer, e.g., an elastomer having a Shore hardness of from about 85 A to about 95 A. Such an article of manufacture can be made from compositions of this invention utilizing an aromatic diamine in admixture with a minor amount of a hydroxy functional compound—e.g., a triol. Generally, a minor amount is defined as up to 10 mole %, based on the weight of the curative mixture. However, more or less can be used depending on the physical properties desired, as those skilled in the art can appreciate. Preferably though, an aromatic diamine is used by itself. For other applications—e.g., rolls and rollers—requiring a softer polyurethane elastomer—e.g., having a Shore hardness of from about 30 A to about 70 A—varying amounts (more than a minor amount) of a hydroxy functional compound may be mixed with an aromatic diamine or a hydroxy functional compound may be used by itself.

Hydroxy functional compounds which may be used include, for example, diols, such as, for example, 1,4-butanediol, 1,6-hexanediol, N,N'-hydroxyethylaniline, and the like; and triols, such as, for example, 1,1,1-trimethylolethane, 1,1,1-trimethylolpropane, hexane-1,2,6-triol, hexane-2,4,6-triol, butane-1,2,4-triol, 3-hydroxymethyl-2,4-dihydroxypentane, pentaerythritol, 3,4,8-trihydroxytetrahydrodicyclopentadiene, glycerol; and the like.

Useful aromatic diamines include but are not limited to: 4,4'-methylenebis(o-chloroaniline), 4,4'-methylenebisaniline, 1,2-bis(2-aminophenylthio)ethane, trimethylene glycol-di-p-aminobenzoate, and the like. The preferred diamine is 4,4'-methylenebis(o-chloroaniline). Other diamines which may be used include 2,6-dichloro-p-phenylene diamine and 2,6-dibromo-p-phenylene diamine (see U.S. Pat. No. 4,089,822, the disclosure of which is incorporated herein by reference).

The prepolymers from which the polyurethanes are prepared have an isocyanate content of at least about 2 wt %, based on the weight of prepolymer. Usually the isocyanate content is within the range of from about 2.0 to about 9.0 wt %, with about 3.0 to about 7.5 wt % being preferred, and from about 4.2 to about 5.5 wt % being more preferred.

Polyurethanes are prepared by well-known methods whereby one or more of the aforementioned polymeric diols is reacted with a stoichiometric excess of the aforementioned tolylene diisocyanate. The resulting reaction product (prepolymer) is then further reacted with a curative, e.g., an aromatic diamine. During prepolymer preparations, benzoyl chloride may optionally be added in amounts from about 0.005 to about 0.1 percent by weight based on the weight of the prepolymer. Those skilled in the art will appreciate that the benzoyl chloride may be employed to keep the prepolymer slightly acidic as may be necessary or desirable in a given application for reasons of processing or obtaining specific prepolymer characteristics.

Optionally a conventional polyurethane catalyst may be used. Catalysts which may be used include but are not limited to mono- and dicarboxylic acids and their metal salts, such as glutaric acid, pimelic acid, azeleic acid, propionic acid, valeric acid, caprioc acid, caprylic acid, myristic acid, palmitic acid, stearic acid, stannous stearate, chromium naphthenate, molybdenum naphthenate and the like. Also useful are tertiary amines, such as triethylene diamine, dimethyl oleylamine, triethylene diamine, N-ethylmorpholine, and the like; and anhydrides of carboxylic acids, such as stearic anhydride, phthatlic anhydride, and the like. The catalyst preferably should either be soluble in the polymer composition or compatible therewith at curing temperatures. The preferred catalysts for the reaction because of ready availability and low cost, are the mono- and dicarboxylic acids. They are normally used in an amount of from about 0.01% to about 1% by weight, based on the weight of curatives, preferably about 0.05% to 0.5% by weight.

The following examples are provided for purposes of illustration only and should not be construed as limiting the invention in any manner. It will be appreciated that variations of the invention which do not depart from the spirit or scope of the invention are possible.

The polyethers of the following examples comprise commercially available products having a weight average molecular weight of from about 445 to about 2100.

Unless noted otherwise, for Examples 2-6 the procedures for prepolymer preparation, polymer curing, wheel molding, wheel aging, and wheel testing on the Dynamometer were the same as for Example 1.

Examples 1 and 3 are comparative examples to Examples 2 and 4, respectively. Examples 5 and 6 are further illustrative examples of the compositions of this invention.

EXAMPLE 1

Polyurethane Elastomer From An 80/20 Isomeric Mixture of 2,4-/2,6- Tolylene Diisocyanate A 2-liter resin flask was equipped with a stirrer, thermometer, $N_2$-tube (reactions were conducted in a nitrogen atmosphere) and addition funnel. To the flask there was added 600 grams of an 80/20 isomeric mixture of 2,4-/2,6- tolylene diisocyanate—i.e., the mixture contained 80 wt % of the 2,4-isomer and 20 wt % of the 2,6-isomer. With stirring there was added a mixture of:

(a) 1280 grams of POLYMEG (a polytetramethylene ether glycol obtained from Quaker Oats) having a hydroxyl number of 112.

(b) 130 grams of PPG-EO (obtained from Olin Chemical under the product designation POLY G, a polypropylene-polyethylene oxide ether glycol) having a hydroxyl number of 173, and (c) 190 grams of PPG-EO (obtained from Olin Chemical under the product designation POLY G) having a hydroxyl number of 56.

The weight average molecular weight of the polyether mixture was about 960.

The liquid batch was then heated to 95° C. and held at this temperature for six hours followed by 16 hours at 65° C. To this batch there was added about 0.5 gram of benzoyl chloride with stirring.

The prepolymer was then passed through a heated thin-film distillation apparatus to remove most of the residual tolylene diisocyanate.

The prepolymer, now essentially devoid of residual tolylene diisocyanate and benzoyl chloride was treated with 0.005 wt % benzoyl chloride, based on the weight of prepolymer. The prepolymer on analysis for isocyanate had an isocyanate level of 5.3 wt %.

In a ratio of one hundred parts of this prepolymer, warmed to 100° C., to 15.1 parts of MOCA (4,4'-methylenebis(o-chloroaniline), warmed to 100° C., the prepolymer and MOCA were mixed to give a uniform solution. The clear solution was rapidly degassed at about 100° C. under a vacuum of 10 mm of Hg to remove dissolved air. The liquid was poured into a hot caster wheel mold (see below) kept at 100° C. The mold was then placed in an oven kept at 1OO° C. for 6 hours. The wheels had a Shore durometer of 90 A.

The hubs and molds used provided wheels 3¼" o.d., 2¼" i.d., and 2⅜" wide. The metal hubs were prepared by methods well known to those skilled in the art. The hubs were degreased with solvent, sand-blasted, degreased again, primed with an adhesive (THIXON 405, Dayton Chemical Co.), and the primer was baked on the hub in an oven set at 100° C. for four hours.

The polyurethane covered hubs were aged at room temperature for about two weeks. The wheels were machined to give a ½" tread and aged at room temperature for about another two weeks before testing on the Dynamometer (the exact length of time aged prior to and after machining is not critical).

On the Dynamometer, which was run at 6.5 mph (1000 rpm), this wheel achieved an equilibrium internal tread temperature of 100° C. at a load of 880 pounds.

EXAMPLE 2

Polyurethane Elastomer From a 39/61 Isomeric Mixture of 2,4-/2,6- Tolylene Diisocyanate The prepolymer formulation and procedure described in Example 1 was used, except that the toluene diisocyanate used comprised an isomeric mixture of 39 wt % 2,4- and 61 wt % 2,6-toluene diisocyanate. The resulting prepolymer had an isocyanate content of 4.91 wt %.

This prepolymer was cured with MOCA in a ratio of 100 parts prepolymer to 14.0 parts MOCA and poured into a caster wheel mold to give a Shore A hardness of 91.

The caster wheel run on the Dynamometer at 6.5 mph ran cooler than the wheel in Example 1. The wheel of Example 2 took a load of 1030 pounds to achieve an internal tread temperature of 100° C., whereas the wheel of Example 1 took a load of 880 pounds.

A comparison of Example 1 (a composition not of this invention) with Example 2 (a composition of this invention) demonstrates the superior dynamic properties of the compositions of this invention.

The composition of Example 2 has a lower heat buildup than the composition of Example 1. Stated in another way, the compositions of this invention yield wheels which can carry a significantly greater load before reaching the same temperature as a wheel made from compositions not of this invention.

EXAMPLE 3

Polyurethane Elastomer From an 80/20 Isomeric Mixture of 2,4-/2,6- Tolylene Diisocyanate When 1000 grams of PPG (polypropylene ether glycol, having a hydroxyl number of 112, from Union Carbide under the product designation NIAX), having a weight average molecular weight of about 1000, is reacted with 348 grams of a mixture of 80 wt % 2,4- and 20 wt % 2,6-toluene diisocyanate, a prepolymer with an isocyanate content of 5.2 wt % results. This prepolymer, when cured in a ratio of 100 parts prepolymer to 14.8 parts MOCA and molded, gives a polyurethane caster wheel of 90 A shore hardness.

When this wheel was run on the Dynamometer, the wheel heated up rapidly. An internal tread temperature of 100° C. was reached with only a load of 600 pounds.

EXAMPLE 4

Polyurethane Elastomer From a 45/55 Isomeric Mixture of 2,4-/2,6- Tolylene Diisocyanate When 266 grams of PPG, having a hydroxyl number of 252, and 988 grams of PPG having a hydroxyl number of 55.5 (both obtained from Union Carbide under the product designation NIAX), the mixture having a weight average molecular weight of about 1154, were reacted with 417 grams of an isomeric mixture of tolylene diisocyanate, having an isomer distribution of 45 wt % of the 2,4-isomer and 55 wt % of the 2,6-isomer, a prepolymer was obtained with an isocyanate content of 4.63 wt %.

On curing this prepolymer with MOCA in a ratio of 100 parts prepolymer to 13.2 parts MOCA, a wheel having a Shore A hardness of 90 was obtained.

When a caster wheel covered with this polyurethane was run on the Dynamometer, a 930 pound load was required to reach an internal tread temperature of 100° C., whereas the wheel of Example 3 took 600 pounds.

A comparison of Example 3 (a composition not of this invention) with Example 4 (a composition of this invention) demonstrates the superior properties of the compositions of this invention.

The composition of Example 4 has a lower heat buildup than the composition of Example 3. Stated in another way, the compositions of this invention yield wheels which can carry a significantly greater load before reaching the same temperature as a wheel made from compositions not of this invention.

EXAMPLE 5

Polyurethane Elastomer From a 45/55 Isomeric Mixture of 2,4-/2,6- Tolylene Diisocyanate In this example, 432 parts of toluene diisocyanate composed of 55 wt % of the 2,6- isomer and 45 wt % of the 2,4- isomer were reacted with a mixture of polyether macroglycols of the polypropylene-polyethylene type (obtained from Olin Chemical under the product designation POLY G). One polyether, 718 parts, had a hydroxyl number of 173.8; the other polyether, 785 parts, had a hydroxyl number of 56.0. The weight average molecular weight of the macroglycol mixture was about 1000.

The resulting liquid urethane prepolymer had an isocyanate content of 4.98 wt %.

This prepolymer was cured with MOCA in a ratio of 100 parts prepolymer to 14.2 parts MOCA and poured into a caster wheel mold to give a Shore hardness of 90.

This caster wheel took a 950 pound load to achieve an internal tread temperature of 100° C.

EXAMPLE 6

Polyurethane Elastomer From a 45/55 Isomeric Mixture of 2,4-/2,6- Tolylene Diisocyanate In this example, to 613 grams of a toluene diisocyanate isomeric mixture comprising 45 wt % of the 2,4- isomer and 55 wt % of the 2,6- isomer, there was added slowly with stirring a mixture of 752 grams of PPG-EO glycol having a hydroxyl number of 173 and 858 grams of PPG-EO glycol having a hydroxyl number of 56 (both PPG-EO glycols were obtained from Olin Chemical under the product designation POLY G). The weight average molecular weight of the glycol mixture was about 1015.

The prepolymer which resulted had an isocyanate content of 4.95 wt %.

This prepolymer when cured with MOCA in a ratio of 100 parts prepolymer to 14.1 parts MOCA and molded gave a caster wheel of 90 Shore A hardness.

On the Dynamometer, this wheel ran cool requiring a load of 960 pounds before it achieved a tread temperature of 100° C.

Tables I and II summarize the following physical properties of the compositions of Examples 1–4 and 5–6, respectively:
Hardness, Shore A, ASTM 2240
100% Modulus, ASTM D-412
Ultimate Tensile Strength, ASTM D-412
Elongation, %, ASTM D-412
Compression Set, B, %, ASTM 395-B

TABLE I

Physical Properties of Compositions of Examples 1–4

| | EXAMPLES | | | |
|---|---|---|---|---|
| | 1 | 2 | 3 | 4 |
| COMPOSITION | | | | |
| 2,4-/2,6- Ratio | 80/20 | 39/61 | 80/20 | 44/55 |
| Polyol(s) | PTMEG* PPG-EO | PTMEG* PPG-EO | PPG — | PPG — |
| WHEEL LOAD | | | | |
| Load, lbs. | 880 | 1030 | 600 | 930 |
| PROPERTY | | | | |
| Hardness, Shore A | 90 | 91 | 90 | 90 |
| 100% Modulus, psi | 1220 | 1470 | 1200 | 1390 |
| Ultimate Tensile Strength, psi | 4000 | 3000 | 3100 | 2900 |
| Elongation, % | 350 | 300 | 250 | 390 |
| Compression Set, | 31 | 26 | 25 | 35 |

TABLE I-continued

Physical Properties of Compositions of Examples 1-4

| | EXAMPLES | | | |
|---|---|---|---|---|
| | 1 | 2 | 3 | 4 |
| B, % (22 hrs. at 70° C.) | | | | |

*polytetramethylene ether glycol

TABLE II

Physical Properties of Compositions of Examples 5-6

| | EXAMPLES | |
|---|---|---|
| | 5 | 6 |
| COMPOSITION | | |
| 2,4-/2,6- Ratio | 44/55 | 44/55 |
| Polyol(s) | PPG-EO | PPG-EO |
| | — | — |
| WHEEL LOAD | | |
| Load, lbs. | 950 | 960 |
| PROPERTY | | |
| Hardness, Shore A | 90 | 90 |
| 100% Modulus, psi | 1030 | 1160 |
| Ultimate Tensile Strength, psi | 2900 | 3470 |
| Elongation, % | 380 | 370 |
| Compression Set, B, % (22 hrs. at 70° C.) | 25 | 28 |

The pot life of conventional castable polyurethane elastomers—e.g., those produced from 80 wt % of the 2,4- isomer and 20 wt % of the 2,6- isomer of tolylene diisocyanate—is normally about 8 to 12 min. The pot life of the compositions of this invention is about 2 to about 4 minutes, which however does not present any problems for conventional molding equipment.

FIG. 1 graphically illustrates the heat buildup in the wheel treads produced from the compositions of Examples 1-6. As shown by the drawing, the compositions of this invention have superior dynamic properties in that they have a lower heat buildup compared to compositions not of this invention.

We claim:

1. A polyurethane elastomer composition, having low heat buildup characteristics, comprising the reaction product of:
   (a) a polyurethane prepolymer having terminally reactive isocyanate groups and formed as a reaction product of polymeric diol with a stoichiometric excess of a mixture of the 2,6- and 2,4- isomers of tolylene diisocyanate, wherein said mixture contains from about 50 to about 90 wt. %, based on the weight of the isomeric mixture, of the 2,6-isomer, with
   (b) a curatively effective amount of an aromatic diamine selected from the group consisting of 4,4'-methylenebis(o-chloroaniline); 4,4'-methylenebisaniline; 1,2-bis(2-aminophenylthio)ethane: and trimethylene glycol-di-p-aminobenzoate, in the presence of
   (c) optionally, from about, 0.01 to 1 part of catalyst per hundred parts of prepolymer, said catalyst being selected from the group consisting of mono and dicarboxylic acids, metal salts of mono and dicarboxylic acids, carboxylic acid anhydrides and tertiary amines.

2. An elastomer according to claim 1 wherein said mixture of (a) contains from about 50 to about 75 wt %, based on the weight of the isomeric mixture, of 2,6-tolylene diisocyanate.

3. An elastomer according to claim 1 wherein said mixture of (a) contains from about 50 to about 65 wt %, based on the weight of the isomeric mixture, of 2,6-tolylene diisocyanate.

4. An elastomer according to claim 1 wherein said polymeric diol is:
   (i) a polyether selected from the group consisting of polytetramethylene ether glycol; polypropylene ether glycol; polypropylene-polyethylene oxide ether glycol; and mixtures thereof; or
   (ii) a polyester selected from the group consisting of polyethyleneadipate; polypropyleneadipate; poly-(ethylene-propylene)adipate; polybutyleneadipate; polyhexamethyleneadipate; polycaprolactone; and mixtures thereof; or
   (iii) a compatible mixture of polyether diols and polyester diols.

5. An elastomer according to claim 1 wherein said curative is present within the range of from about 80 to about 110% of the stoichiometrically required amount.

6. An elastomer according to claim 1 wherein said catalyst of (c) is stearic acid, azelaic acid, or triethylene diamine.

7. An elastomer according to claim 1 wherein said aromatic diamine of (b) is 4,4'-methylenebis(o-chloroaniline).

8. An elastomer according to claim 7 wherein said diamine is present within the range of from about 80 to about 110% of the stoichiometrically required amount.

9. An elastomer according to claim 1 wherein said prepolymer has an isocyanate content of from about 2.0 to about 9.0 wt %, based on the weight of prepolymer.

10. A polyurethane elastomer composition, having low heat buildup characteristics, comprising the reaction product of:
   (a) a polyurethane prepolymer having terminally reactive isocyanate groups and having an isocyanate content of from about 2.0 to about 9.0 wt %, based on the weight of prepolymer, and formed as a reaction product of polymeric diol with a stoichiometric excess of a mixture of the 2,6- and 2,4- isomers of tolylene diisocyanate, wherein said mixture contains from about 50 to about 90 wt %, based on the weight of the isomeric mixtures, of the 2,6-isomer, with
   (b) from 80 to 110% of the stoichiometrically required amount of 4,4'-methylenebis(o-chloroaniline), in the presence of
   (c) optionally, from about 0.01 to 1 part of catalyst per hundred parts of prepolymer said catalyst being selected from the group consisting of mono and dicarboxylic acids, metal salts of mono and dicarboxylic acids, carboxylic acid anhydrides and tertiary amines.

11. An elastomer according to claim 10 wherein said polymeric diol of (a) is:
   (i) a polyether selected from the group consisting of polytetramethylene ether glycol; polypropylene ether glycol; polypropylene-polyethylene oxide ether glycol; and mixtures thereof; or
   (ii) a polyester selected from the group consisting of polyethyleneadipate; polypropyleneadipate; poly-(ethylene-propylene)adipate; polybutyleneadipate; polyhexamethyleneadipate; polycaprolactone; and mixtures thereof; or
   (iii) a compatible mixture of polyether diols and polyester diols.

12. An elastomer according to claim 10 wherein said catalyst of (c) is stearic acid, azelaic acid, or triethylene diamine.

13. An article of manufacture comprising the composition of claim 1.

14. An article of manufacture comprising the composition of claim 10.

15. An article of manufacture having low heat buildup characteristics comprising a polyurethane elastomer composition comprising the reaction product of:
   (a) a polyurethane prepolymer having terminally reactive isocyanate groups and formed as a reaction product of polymeric diol with a stoichiometric excess of a mixture of the 2,6- and 2,4- isomers of tolylene diisocyanate wherein said mixture contains from about 40 to about 100 wt % of the 2,6-isomer, with
   (b) a curingly effective amount of an aromatic diamine selected from the group of 4,4'-methylenebis(o-chloroaniline); 4,4'-methylenebisaniline; 1,2-bis(2-aminophenylthio)ethane; and trimethylene glycol-di-p-aminobenzoate, in the presence of
   (c) optionally, from about, 0.01 to 1 part of catalyst per hundred parts of prepolymer said catalyst being selected from the group consisting of mono and dicarboxylic acids, metal salts of mono and dicarboxylic acids, carboxylic acid anhydrides and tertiary amines.

16. An article according to claim 15 wherein said curative of (b) is present within the range of from about 80 to about 110 of the stoichiometrically required amount.

17. An article according to claim 15 wherein said polymeric diol is:
   (a) a polyether selected from the group consisting of polytetramethylene ether glycol; polypropylene ether glycol; polypropylene-polyethylene oxide ether glycol; and mixtures thereof; or
   (b) a polyester selected from the group consisting of polyethyleneadipate; polypropyleneadipate; poly(ethylene-propylene)adipate; polybutyleneadipate; polyhexamethyleneadipate; polycaprolactone; and mixtures thereof; or
   (c) a compatible mixture of said polyether diols and said polyester diols 18. An article according to claim 15 wherein said diamine is 4,4'-methylenebis(o-chloroaniline).

19. An article of manufacture of claim 17 wherein said aromatic diamine is 4,4'-methylenebis(o-chloroaniline) and is present in from 80 to 110% of the stiochiometric required amount.

20. A method of making tolylene diisocyanate-based castable polyurethane elastomers having low heat buildup characteristics comprising reacting:
   (a) a stoiciometric excess of 2,6-tolylene diisocyanate, or a mixture of the 2,4- and the 2,6- isomers of tolylene diisocyante containing at least about 40 wt %, based on the wieght of the isomeric mixture, of the 2,6-isomer; with
   (b) a polymeric diol;
to form a prepolymer; and curing said prepolymer with
   (c) a curatively effective amount of an aromatic diamine selected from the group consisting of 4,4'-methylenebis (o-chloroaniline); 4,4'-methylenebisaniline; 1,2-bis(2-aminophenylthio)ethane; and trimethylene glycol-di-p-aminobenzoate; in the presence of
   (d) optionally, from about, 0.01 to 1 part of catalyst per hundred parts of prepolymer, said catalyst being selected from the group consisting of mono and dicarboxylic acids, metal salts of mono and dicarboxylic acids, carboxylic acid anhydrides and tertiary amines.

21. A method of claim 20 wherein said mixture contains from about 50 to about 90 wt %, based on the weight of the isomeric mixture, of the 2,6- isomer.

22. A method of claim 20 wherein said mixture contains from about 50 to about 75 wt %, based on the weight of the isomeric mixture, of said 2,6- isomer.

23. A method according to claim 20 wherein said mixture contains from about 50 to about 65 wt %, based on the weight of the isomeric mixture of said 2,6-isomer.

24. A method of claim 20 wherein said polymeric diol is:
   (a) a polyether selected from the group consisting of polytetramethylene ether glycol; polypropylene ether glycol; polypropylene-polyethylene oxide ether glycol; and mixtures thereof; or
   (b) a polyester selected from the group consisting of polyethyleneadipate; polypropyleneadipate; poly(ethylenepropylene) adipate; polybutyleneadipate; polyhexamethyleneadipate; polycaprolactone; and mixtures thereof; or
   (c) a compatible mixture of polyether diols and polyester diols.

25. A method of claim 20 wherein said aromatic diamine is 4,4'-methylenebis(o-chloroaniline).

26. A method of claim 20 wherein said polymeric diol is:
   (a) a polyether selected from the group consisting of polytetramethylene ether glycol; polypropylene ether glycol; polypropylene-polyethylene oxide ether glycol; and mixtures thereof; or
   (b) a polyester selected from the group consisting of polyethyleneadipate; polypropyleneadipate; poly(ethylene-propylene)adipate; polybutyleneadipate; polyhexamethleneadipate; polycaprolactone; and mixtures thereof; or
   (c) a compatible mixture of polyether diols and polyester diols; and
wherein said aromatic diamine is 4,4'-methylenebis(o-chloroaniline) present in from 80 to 110% of the stoichiometric required amount.

* * * * *